United States Patent [19]

Neverman

[11] Patent Number: 4,753,784
[45] Date of Patent: Jun. 28, 1988

[54] PROCESS TO REMOVE SOX AND NOX FROM EXHAUST GASES

[76] Inventor: Duane C. Neverman, 1301 N. Carol St., La Habra, Calif. 90631

[21] Appl. No.: 835,746

[22] Filed: Mar. 3, 1986

[51] Int. Cl.$^4$ .............................................. B01D 53/34
[52] U.S. Cl. ....................................... 423/235; 423/242
[58] Field of Search ...................... 55/69, 80; 423/235, 423/242 A, 235 D; 110/215, 203

[56] References Cited

U.S. PATENT DOCUMENTS

| | | | |
|---|---|---|---|
| 3,904,735 | 9/1975 | Atwood et al. | 423/243 |
| 3,932,585 | 1/1976 | Moriguchi et al. | 423/235 |
| 4,129,651 | 12/1978 | Koike et al. | 423/235 D |
| 4,235,852 | 11/1980 | Nomoto et al. | 423/235 |
| 4,255,401 | 3/1981 | Nomoto et al. | 423/235 |
| 4,284,609 | 8/1981 | deVries | 423/235 |
| 4,340,572 | 7/1982 | Ben-Shmuel et al. | 423/242 |
| 4,425,313 | 1/1984 | Cooper | 423/235 |
| 4,444,128 | 4/1984 | Monro | 110/215 |
| 4,454,100 | 6/1984 | Faatz | 423/210 |
| 4,494,967 | 1/1985 | Barth | 55/74 |

FOREIGN PATENT DOCUMENTS 3342 8/1985 PCT Int'l Appl. ................. 110/215

OTHER PUBLICATIONS

Introduction to Chemical Engineering Thermodynamics, Smith & Van Ness, 3rd Ed. 1975, McGraw-Hill Book Co., pp. 490–491.
Perry's Chemical Engineers' Handbook, 6th Ed., Ed. Perry et al., McGraw-Hill Book Co., 1984, pp. 9–76; 18–19, 20; 24–36; 26–5.
Momentum, Heat, and Mass Transfer, 2nd ed. Bennett & Myers, McGraw-Hill Book Co. 1974, pp. 452–453.

Primary Examiner—John Doll
Assistant Examiner—Jeffrey Edwin Russel
Attorney, Agent, or Firm—William W. Haefliger

[57] ABSTRACT

A process to remove SOX and NOX from combustion exhaust gases includes the steps:

(a) employing a coolant for cooling a stream of the exhaust gas to a temperature below the dew point, whereby contained moisture condenses, and SOX and NOX dissolve in the condensate to form acidic liquid in the cooled gaseous stream, (b) scrubbing the stream of cooled gas and acidic liquid with an alkaline solution thereby to neutralize the acid in said stream and form salts dissolved in the said solution, (c) and extracting energy from the coolant which is heated during said (a) step.

11 Claims, 1 Drawing Sheet

PROCESS TO REMOVE SOX AND NOX FROM EXHAUST GASES

BACKGROUND OF THE INVENTION

This invention relates generally to recovery of energy from exhaust gases, such as high temperature combustion gases, and also removal of pollutants from such gases.

There is a need for efficient processes for recovering energy from and removing pollutants from combustion gases, particularly those formed at stationary combustion equipment.

SUMMARY OF THE INVENTION

It is a major object of the invention to provide a highly efficient and simple process, and apparatus, meeting the above need, whereby SOX (oxides of sulfur) and NOX (oxides of nitrogen) are removed and recovered as usable or disposable salts, or solutions of salts. Basically, the process comprises the steps:

(a) employing a coolant for cooling a stream of the exhaust gas to a temperature below the dew point, whereby contained moisture condenses, and SOX and NOX dissolve in the condensate to form acidic liquid in the cooled gaseous stream, (b) scrubbing the stream of cooled gas and acidic liquid with an alkaline solution thereby to neutralize the acid in said stream and form salts dissolved in the said solution, (c) and extracting energy from the coolant which is heated during said (a) step.

Further and as will be seen, packing may be employed in a scrubbing zone to ensure complete contact of the exhaust gas and condensate with the alkaline solution to complete the neutralization of acids formed, and to induce additional SOX and NOX to dissolve in the condensate, forming additional acids which are then neutralized to form additional dissolved salts, and including collecting all of said salts or solutions of salts, and removing scrubbed gas from said zone.

The invention also contemplates adding NH₃ to the exhaust gas stream prior to said a) step, and mixing NH₃ or alkaline solution with condensate forming on cooling tubes in the (a) step cooling zone, and to neutralize the acidic condensate, and removal of the latter.

Further regarding the above (a) step, it may be advantageously carried out by passing the exhaust gas in heat exchange relation with said coolant in the form of a pressurized organic or other liquid, to heat and vaporize the liquid to form a pressurized gas. That gas may then be expanded to drive a tubine to drive a load. The expanded coolant may then be condensed and re-pressurized for return to the process.

Regarding step (b) of the process, scrubbing may be carried out by passing the stream of cooled gas and acidic liquid countercurrently with a spray of said alkaline solution, in a scrubbing zone, which may or may not include a contact medium.

These and other objects and advantages of the invention, as well as the details of an illustrative embodiment, will be more fully understood from the following specification and drawings, in which:

DRAWING DESCRIPTION

DETAILED DESCRIPTION

In the following, like-numbered elements of the figures are the same.

Figure 1:
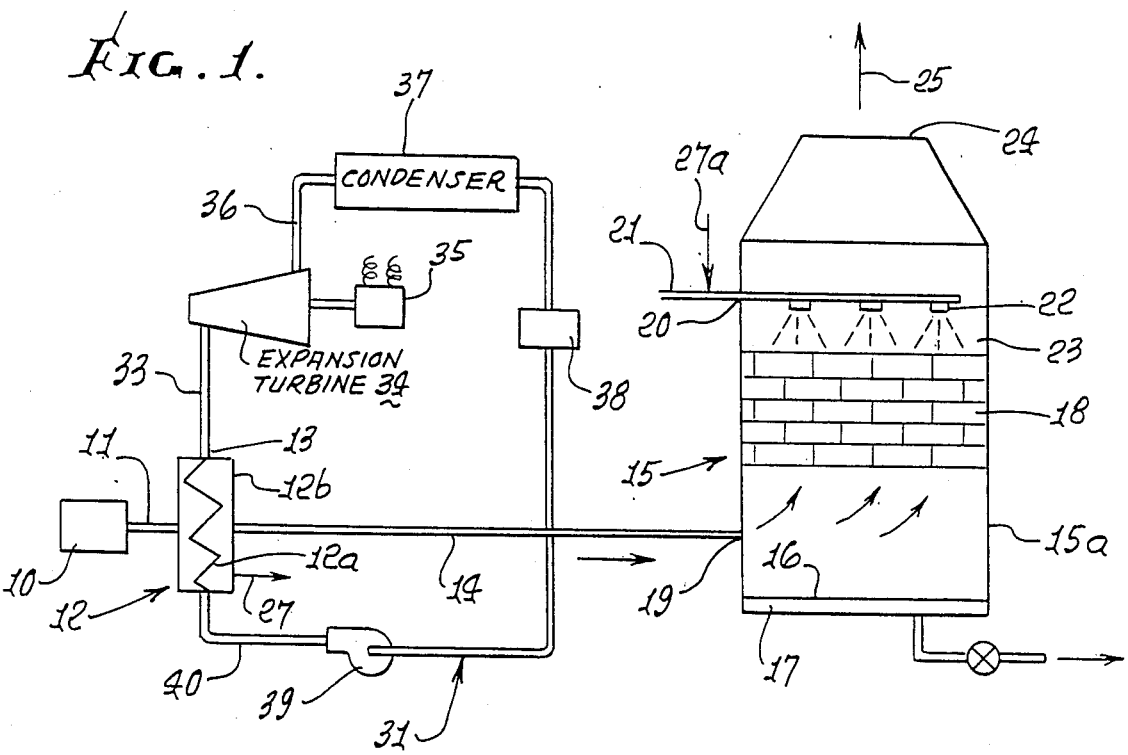
FIG. 1 is a flow diagram illustrating the process of the invention.

In FIG. 1, flue gas, i.e. products of combustion as from a stationary source 10, is fed at 11 to a heat exchanger 12. The gas is cooled to a temperature below the dew point of the gas, as by passing it over a cooling coil 12a through which coolant fluid flows under pressure. Typical feed gas temperatures at 11 are within the range 200° F. to 1,000° F., and gas temperature leaving the exchanger is typically within the range 100° F. to 200° F. Coolant temperature entering the coil 12a is within the range 30° F. to 100° F., and leaving the coil at 13 the coolant temperature is within the range 100° F. to 250° F. The coolant may be organic, and one usable organic coolant is propane, others being for example, Freon, isobutane, isopentane, methanol, toluene, including mixtures of same. Other coolants, including non-organics can be used (water, ammonia, etc.). Multiple stage or step cooling may be employed, in which even the above temperature ranges may be varied.

As a result of such cooling of the exhaust gas stream, contained moisture condenses, as on the coil surfaces, and SOX (sulfur oxides) and/or NOX (nitrogen oxides) in the gas stream dissolve or are dispersed in the aqueous condensate to form an acidic (dilute) aqueous liquid, or liquid particles, transported in the cooled gas stream at 14.

Next, the cooled gas stream is fed to a scrubber 15, wherein the cooled gas and acidic liquid, or liquid particles, are scrubbed with an alkaline solution, whereby the acids formed by the SOX and/or NOX are neutralized and form salts collected at 16, at the collector 17 in the bottom of the scrubber. Such salts may be dissolved in liquid droplets collecting at 17. Scrubbing and neutralization, taking place for example in the scrubber packing 18 (grids, bubble trays, rings, for example) induce additional SOX and NOX in the gas stream to dissolve in the condensate droplets, such SOX and NOX having been carried over in the gas stream to the scrubbing zone at the packing.

The scrubber 15 typically includes a housing 15a with lower inlet at 19 for the acidic gas stream, an upper side inlet 20 for alkaline fluid supplied as via pipe 21, and spray heads 22 in upper zone 23 above the packing. An upper exit 24 is provided for removal of scrubbed gas, indicated by arrow 25; and a lower outlet 26 is provided for exit of salt solution, or salt deposits.

Condensation from the exterior of cooling coil 12a is withdrawn at 27 from the heat exchanger housing 12b, and passed at 27a to the pipe 21 for mixing with the alkaline solution supply, for neutralization as described. Typical alkaline solutions are formed by dissolving one or more of the following in water: calcium hydroxide, sodium hydroxide, potassium hydroxide and ammonia.

The coolant employed to initially cool the exhaust gas in exchanger 12 is, with unusual advantage, typically circulated in a closed loop system 31 providing minimized loss of energy of the process, as by energy utilization. Thus, the coolant which is heated and vaporized in exchanger 12 is passed at 33 to an expansion turbine 34, wherein the pressurized coolant expands to drive the turbine, thereby extracting heat energy from the coolant. The turbine is used to drive a load 35 such as an electrical generator, or other device.

After passing through the turbine, the coolant gas flows at 36 to condenser 37 wherein it is condensed. The condensate may be cooled at 38; it is then passed to pump 39 for re-pressurization and return at 40 to the exchanger 12 for repeating the exhaust gas cooling function.

Figure 2:
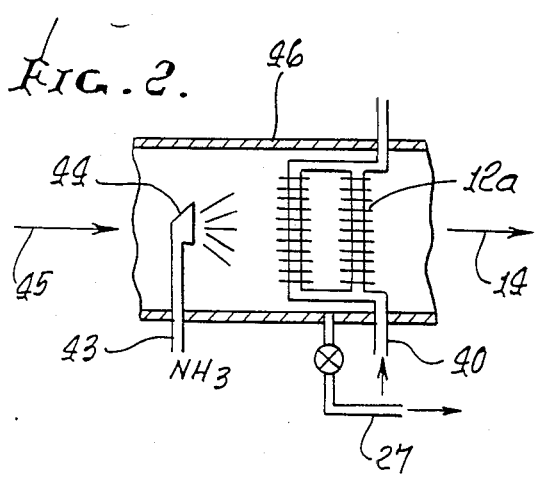
FIG. 2 is a fragmentary view showing heat transfer details.

FIG. 2 shows the step of adding or introducing $NH_3$, as via pipe 43 and spray head 44, to the initial exhaust gas stream 45 being passed to the cooling coil or coils (or tubes) 12a, in a duct 46. As condensate forms, the $NH_3$ spray neutralizes SOX and/or NOX acids in the water particles, or drainage from the coils, to provide an initial neutralization of the dissolved acidic contents of the forming condensate being subsequently passed at 14 and 27 as previously described.

Figure 3:
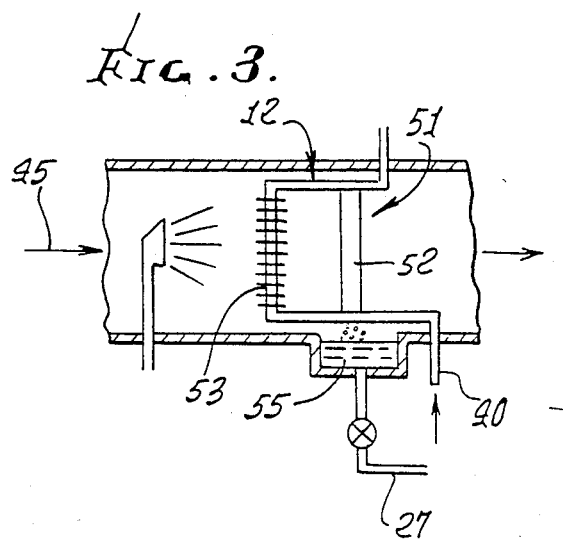
FIG. 3 is a fragmentary view showing a modification in heat transfer.
Figure 4:
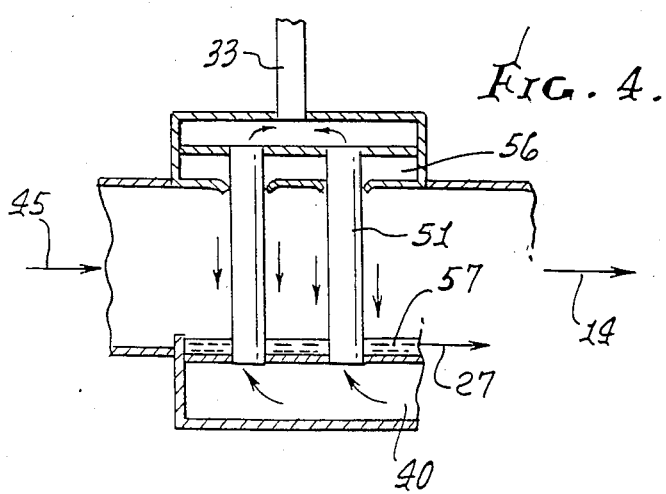
FIG. 4 is a vertical section showing a modified neutralization method.

FIG. 3 illustrates the step of employing a cooling tube or tubes 51 with a smooth outer surface 52, or surfaces, in exchanger 12, typically in conjunction with a finned tube or tubes 53 for coolant. The surface 52 provides a smooth upright condensing surface via which condensate may form and drain, for collection at 55, and removal, as at 27 described above. $NH_3$ may be added to the exhaust gas upstream of tubes 51, for purposes described in connection with FIG. 2. In FIG. 4, the construction is like that of FIG. 3, but alkaline solution is supplied as via manifold 56 to drain down the surfaces of the tube 51, and assist in neutralizing the forming acidic condensate, which is collected at 57, and removed at 27.

If desired, there may be multiple of said finned and smooth outer surface tubes, employed in groups or clusters or stages, the intent being to realize maximum condensation on the smooth surface tubes, and minimum condensation on the finned tubes, so that less expensive metallurgy may be employed on the finned tubes.

In FIG. 3, separate coolant streams may be fed to the smooth and finned surface tubes for better control of condensation, preferred on the smooth surface tube.

While in FIG. 3, neutralization of acid occurs immediately at the surface of the smooth surface tube, this effect is enhanced in FIG. 4 by alkaline liquid supply to drain down the tube surface.

I claim:

1. In a process to remove oxides of sulfur and nitrogen from combustion exhaust gases, the steps that include:
   (a) flowing a stream of the exhaust gas through a processing zone,
   (b) flowing a coolant fluid through said zone via coolant flow tubing to indirectly cool the exhaust gas stream to a temperature below the dew point of the stream thereby to produce condensate containing acidic constituents at surfaces of the tubing,
   (c) also flowing gas consisting of anhydrous $NH_3$ into said zone at the same time and place as the temperature of the stream is reduced approximately to the dew point to initially neutralize such condensate containing acid constituents, immediately at said surfaces, and
   (d) collecting products of the neutralizing reaction as well as unreacted acid gas constituents in the stream in such condensate and removing the said condensate from said zone.

2. The process of claim 1 including flowing gas from said zone and scrubbing the gas with an alkaline solution and in a scrubbing zone, and wherein packing is employed in said scrubbing zone to achieve greater contact between the cooled gas and the alkaline solution, and removing scrubbed gas from said zone.

3. The process of claim 2 including passing liquid condensate formed by step d for mixing with said alkaline solution, in said scrubbing zone.

4. The process of claim 1 wherein said (a) and (b) steps are carried out by passing the exhaust gas in heat exchange relation with said coolant in the form of an organic liquid, to vaporize the liquid, and to form a pressurized gas.

5. The process of claim 4 which includes expanding said pressurized gas, and driving a turbine with said expanding gas.

6. The process of claim 5 including condensing said organic gas following said expansion thereof to form an organic liquid condensate, pressurizing the condensate, and re-cycling the pressurized and cooled organic condensate to said process for cooling said exhaust gas stream.

7. The process of claim 6 wherein the condensate is refrigerated prior to said pressurizing step.

8. The process of claim 1 including also supplying neutralizing fluid to drain down the surfaces of said coolant flow tubing to mix with and assist in neutralizing the forming acidic condensate, which is subsequently collected and removed.

9. The process of claim 2 wherein said scrubbing is carried out by passing the stream of cooled gas countercurrently with a spray of said alkaline solution, in the scrubbing zone.

10. The process of claim 1 including employing a smooth outer surfaced cooling tube or tubes in said (b) step to provide an upright condensing surface or surfaces, via which condensate forms and drains, for collection.

11. The process of claim 10 including also supplying alkaline solution to said smooth surface of the cooling tube or tubes, for mixing with acidic condensate forming on said surface or surfaces, to neutralize said condensate.

* * * * *